United States Patent Office 2,929,689
Patented Mar. 22, 1960

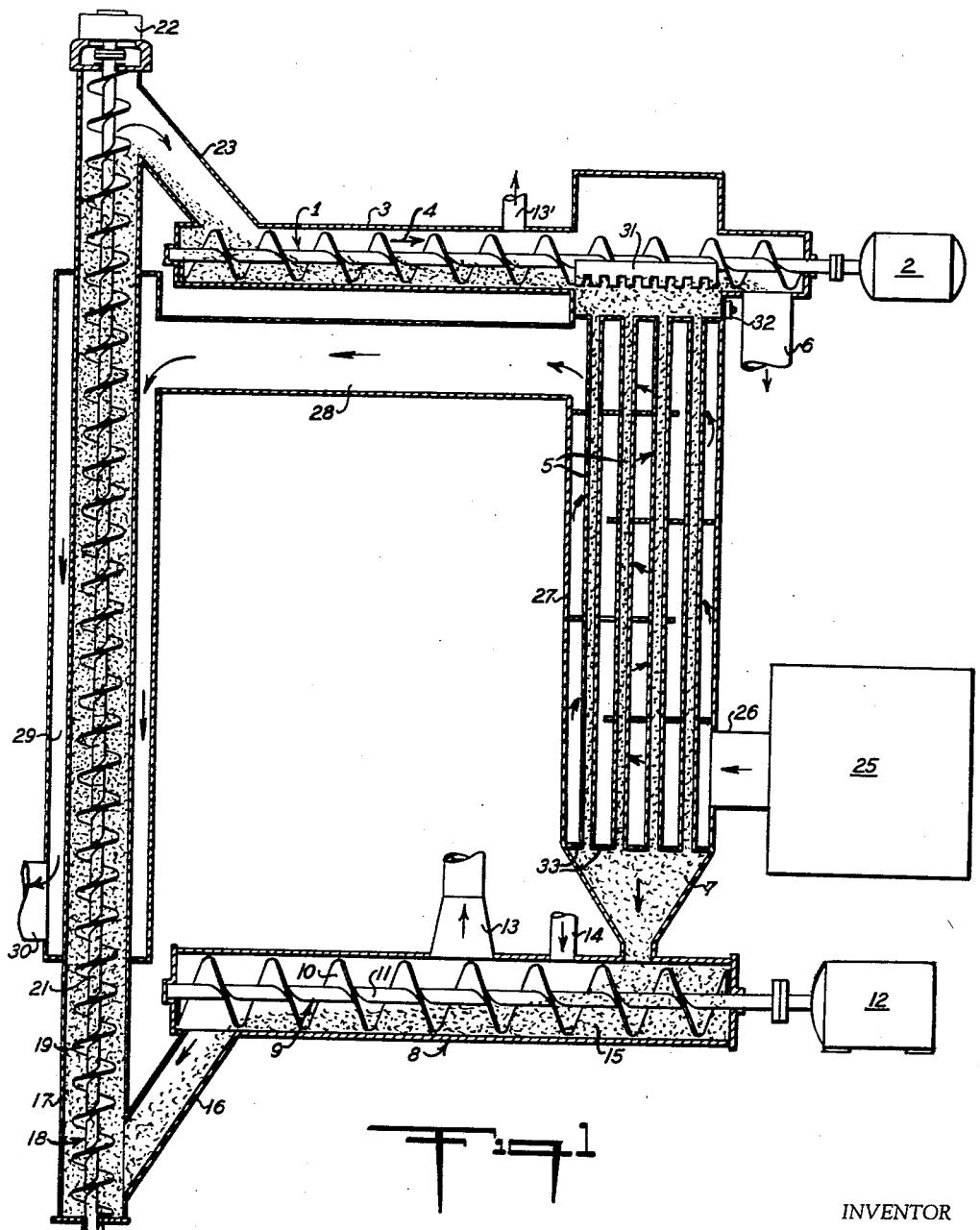

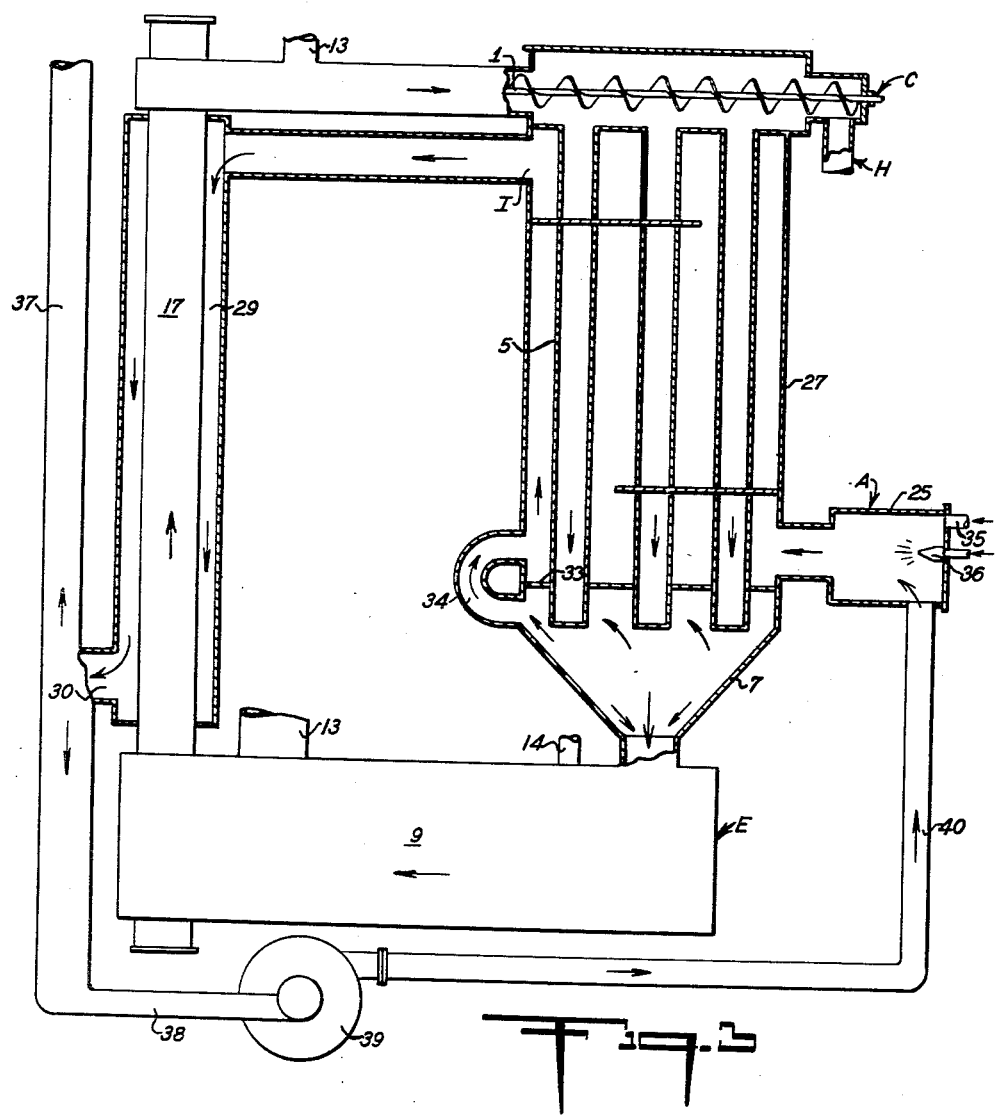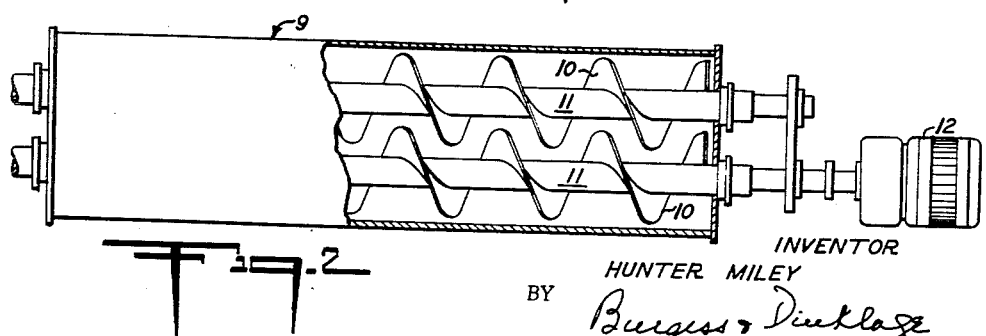

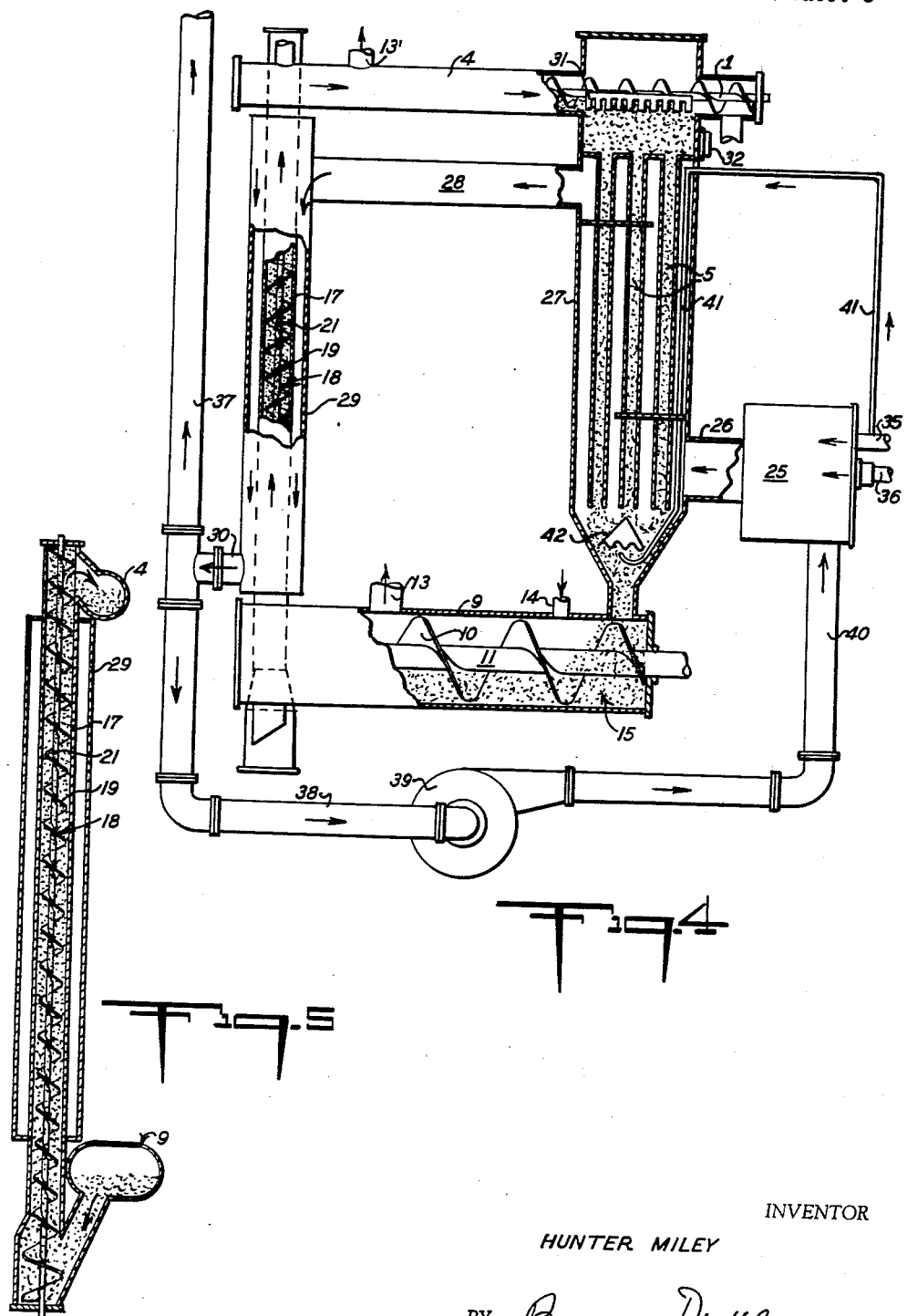

2,929,689

APPARATUS FOR THERMAL DECOMPOSITION OF SLUDGES

Hunter Miley, Petrolia, Pa., assignor to L. Sonneborn Sons, Inc., a corporation of Delaware Application December 9, 1954, Serial No. 474,256

10 Claims. (Cl. 23—261)

This invention relates to improvements in the thermal decomposition of sludges and is a continuation in part of my co-pending application, Serial No. 314,605, filed October 14, 1952, and now abandoned.

The invention more particularly relates to improvements in the thermal decomposition of sludges, produced in the treatment of hydrocarbon oils with sulfuric acid, to recover the sulfur content of the same in the form of sulfur dioxide.

The oils referred to may, for example, be petroleum distillates or petroleum residues, overhead cuts derived from the distillation of coal tars, or hydrocarbon oils produced synthetically by hydrogenation or by the Fischer-Tropsch process. In the course of purifying such oils to meet market specifications, they are treated in liquid phase with strong sulfuric acid to remove those constituents which are most easily reacted with the acid. Where a mild treatment only is desired, the acid may range from 93 to 98%, but where a more rigorous treatment is required, as, for example, in the manufacture of technical and medicinal white oils, fuming acid or sulfuric anhydride is employed. The expression "sulfuric acid" as used in the claims includes sulfuric anhydride. After such treatment, the reaction mass stratifies, with the treated hydrocarbon oil above and with a sludge layer below. The sludge layer contains products of the reaction between the sulfuric acid and the hydrocarbons together with unreacted sulfuric acid. These sludges are found in varying degrees of fluidity, depending on the type and character of hydrocarbon reacted and the amount of residual sulfuric acid present. Various methods have been described in the prior art for the treatment of such sludges to recover the major part of the sulfur present in the form of sulfur dioxide.

One object of this invention is an improvement over all such known sludge-treating methods which will allow the obtaining of a more concentrated sulfur dioxide and a firmer coke containing only relatively small amounts of residual sulfur. This, and still further objects, will become apparent from the following description read in conjunction with the drawing, in which:

Fig. 1 is a diagrammatic showing of an embodiment of an apparatus for effecting the thermal decomposition of sludges in accordance with the invention;

Fig. 2 is a plan view showing the conveyor mixer of the embodiment shown in Fig. 1 with the casing partially cut away;

Fig. 3 is a diagrammatic showing of a further embodiment of an apparatus for decomposing heavier or oilier sludges in accordance with the invention;

Fig. 4 is a diagrammatic showing of still a further embodiment of an apparatus for decomposing oilier or heavier sludges in accordance with the invention; and Fig. 5 is a diagrammatic section through the roto lift of the embodiment shown.

Referring to the embodiment shown in Fig. 1 of the drawing, 1 designates a horizontal worm conveyor driven by any suitable means diagrammatically indicated by 2. Worm conveyor 1 is mounted in tubular housing 3 and operates to move granular material in the direction indicated by arrow 4, discharging it by gravity into a bank of vertical pipes 5, and discharging any excess over that carried away by these vertical pipes, into the outlet 6. A grizzly 31 is positioned directly below the worm conveyor 1 at the portion directly above the bank of vertical pipes 5 so that any oversize particles or lumps will not discharge into the bank of pipes which might tend to clog the same. Additionally, a vibrator 32 of any known or conventional construction is connected to the side wall of the casing adjacent the inlet to the vertical pipes 5. The vibrator 32 insures an even and smooth flow of the materials into the vertical pipes, and additionally prevents clogging. The vertical pipes 5 in turn discharge into funnel-shaped hopper 7, discharging into tubular casing 8. Within the casing 8 there is provided the horizontally disposed conveyor mixer 9. The conveyor mixer 9 consists of a conveyor having two parallel rotatably mounted worm shafts 11 driven in the same direction by the motor 12. The worm blades 10 of each shaft 11 have the same direction of pitch and mesh with each other. With this arrangement a very excellent mixing and conveying is effected and the intermeshing, similarly rotating worms are self-cleaning, thus preventing any clogging. In order to increase the capacity, it is also possible to use additional worms, as, for example, three worms equally spaced from each other in a housing of triangular cross-section. The worms may also, of course, have opposite pitches and rotate in opposite directions. Casing 8 is provided with vent 13, through which gas may be taken off. Any gas accumulating in housing 3 may be withdrawn through pipe 13'. Casing 8 is also provided with pipe 14, through which sludge may be introduced to be incorporated by the conveyor mixer 9 with solid particles contained in the casing 8. The conveyor mixer 9 moves the body of particles 15 within the casing 8 toward the discharge outlet 16 oriented downwardly at an angle of about 45°. The discharge outlet passes the material into the lower end of tubular casing 17, which contains a so-called roto lift 18. This roto lift consists of a conveyor in the form of an Archimedian spiral 19 wound upon the shaft 21, which, in turn, is driven by any suitable means diagrammatically indicated by 22. The shaft 21 is operated at a speed sufficiently high to insure that any particles within the casing 17 will be thrown outwardly by centrifugal force and will therefore hug the inner wall of the casing 17. The operation of the roto lift is therefore similar in principle to that of the ordinary worm conveyor excepting that, since centrifugal force is substituted for gravity, it can operate to move material upwardly; and, whereas in the ordinary worm conveyor, the materials tend to accumulate by gravity in the base of the housing, in the roto lift they are uniformly distributed over the entire interior of the housing. From the upward end of the roto lift the materials are discharged into the duct 23 oriented downwardly at an angle of about 45° and discharging into the intake end of housing 3, which contains the worm conveyor 1. 25 diagrammatically indicates a furnace of any suitable type, in which hot gases, such as, for example, gaseous products of combustion, are generated, passing therefrom through the duct 26 into the housing 27, which surrounds the bank of vertical pipes 5. From the upper end of housing 27 these gases pass through horizontal duct 28 into the vertically disposed housing 29, by which they are downwardly directed around the outer surface of casing 17, to be eventually discharged through duct 30 communicating with a suitable stack not shown.

When starting up the apparatus, the conveyor 1, the conveyor mixer 9, and the roto lift 18 are started in operation, following which finely divided solid material is fed into the apparatus through pipe 14 until it begins to overflow through the outlet 6. As a solid material, coke in subdivided form is preferred, since it approximates in physical characteristics the material to be produced in the operation of the process. Such coke should have a maximum size of about 4 mesh and preferably of about 10 mesh. The actual size is not critical, since it will eventually be displaced by the coke produced in the operation of the process, the particle size of which is determined by the process itself. Following this, the heater 25 is started in operation. As will be noted, the hot combustion gases move generally counter-current to the solid material, with the result that the solid material will have a maximum temperature at the lower end of the vertical pipes 5 and the funnel-shaped hopper 7. Whenever the solid particles at this point have attained a temperature in excess of the decomposition temperature for the particular sludge to be treated, the process may be set in operation by the introduction of sludge through the inlet 14. This sludge is immediately mixed into the solid particles moving within the system by the conveyor mixer 9, thereby forming an intimate mixture. Such sludges ordinarily have a decomposition temperature within the range of from 350–450° F., depending upon the characteristics of the particular sludge, and the volume of sludge introduced is coordinated with the temperature of the particles at 7 to produce a mixture which is at least at the temperature of decomposition of the sludge and not exceeding 500° F. Preferably, the temperature of the mixture does not exceed the decomposition temperature of the sludge treated by more than 50° F. I usually operate within the range of from 350–450° F. To insure smooth and successful operation, the mass of the solid particles moving through 7 should be at least 5 times, and preferably 10 times, the mass of the sludge introduced through 14. The heating effect is immediate and uniform and results in the almost immediate decomposition of the sludge to produce sulfur dioxide in gas phase without any substantial release of the hydrocarbon content of the sludge. I am therefore able in this way to produce a sulfur dioxide gas containing at least 98% sulfur dioxide by volume, with only a trace of hydrocarbons. The decomposition is substantially complete by the time the particles reach the duct 16. At this point, owing to the heat capacity of the sludge and the energy consumed in its decomposition, the moving stream of particles which are entirely free from any apparent liquid material, will be at a temperature within the range of from 300–430° F., and preferably about 330° F. As the particles are moved upwardly by the roto lift 18, part of this heat is restored, and by the time the particles have moved downwardly in the bank of vertical pipes 5 into the hopper 7, they will again have been brought to a temperature sufficiently in excess of the decomposition temperature of the sludge, so that, after mixing with the incoming sludge in the casing 8, the mixture will again be at a temperature in excess of the decomposition temperature of the sludge and preferably within the range of from 350–450° F.

Shortly after the start of operations, solid material will begin to overflow from the outlet 6. This is due to the increased mass of material within the system, resulting from the residual hydrocarbons introduced with the incoming sludge. Eventually, of course, the original particles introduced when starting up will be entirely displaced, with the result that this material is composed entirely of coke particles produced in the system by the decomposition of the sludge. These particles are diverted from the system either for use as fuel or for metallurgical purposes. If the original particles supplied to the system were coke, it would not be necessary to cut this stream at any point, and all of the materials overflowing at 6 may be diverted for either of these purposes.

When using the above-described arrangement with the so-called heavy or oily sludges, it has been found that the viscous or oily or tarry hydrocarbons will accumulate and build up in the continuously circulating body of coke, eventually clogging the device. In accordance with a preferred embodiment of my invention for the decomposition of these heavy or oily sludges with the recovery of the sulfur values, I drive off at least a portion of these hydrocarbons from the circulating body of coke at some point in the cycle, so that a dry coke is produced and maintained in circulation. This driving off of the hydrocarbons from the coke may be effected in various ways.

It has been found preferable to allow the hydrocarbon vapors to escape from the coke after the same has passed through the tubes 5 of the heat exchanger 7 and prior to the mixing of the coke with the sludge.

This may be accomplished, for example, by raising the tube plate 33 to provide a free space above the body of coke emerging from the tubes 5 and a free surface for the escape of the hydrocarbon vapors. These vapors, which escape into this free space, may be removed through any suitable conduit, and, for example, may be recovered or burned in the contact purification furnace of the plant.

Advantageously, these vapors may be piped from this free space below the raised tube plate to the space above the tube plate surrounding the tubes in the heat exchanger, where the same may at least partially burn with the combustion gases passed from the combustion chamber or heater 25, thus supplying additional heat to heat the downwardly moving body of coke.

Such an arrangement is shown in Fig. 3. In this embodiment the tube plate 33 is raised to provide a free surface on the body of coke emerging from the tubes 5 and a free space above this surface through which the oil vapors can escape. A conduit 34 connects this free space below the tube plate 33 to the space in the heat exchanger 27 above the tube plate 33 surrounding the tubes 5.

It has been found preferable to provide a recirculation system for the thus-removed oil vapors to the burner 25. As shown, the combustion gases, along with the removed oil vapors, pass out of the heat exchanger 7 into and through the housing 29, where the same, by indirect heat exchange, heat the material being lifted in the roto lift 17, and through the duct 30 to the stack 37. Also connected to the stack 37 is a conduit 38, a blower 39, and a conduit 40, connecting the blower 39 with the combustion chamber 25. The blower 39 sucks at least a portion of the gases and oil vapors from the stack 37 and forces the same into the combustion chamber 25. In the combustion chamber 25 the quantity of oxygen in the form of air introduced through 35 may be so controlled as to effect complete combustion of the fuel introduced and these oil vapors. The hot combustion gases which then pass through the heat exchanger 27, do not contain sufficient excess oxygen to burn the oil vapors from the conduit 34. The combustion process and the burning of the removed oil vapors may thus be controlled by the amount of air introduced through 35, so that the correct and desired temperature is maintained. By burning the recycled oil vapors, the amount of fuel, such as natural gas introduced through 36, may be cut by more than half.

In all other respects, the construction and operation of the embodiment shown in Fig. 3 is identical to that shown in Figs. 1 and 2. By the removal of the oil vapors in this manner, however, the heavier and oilier sludges may be satisfactorily handled.

In the embodiment shown in Fig. 4, the oil vapors are removed by eliminating the bottom tube plate 33 altogether, thereby providing a path of escape for the oil vapors directly up into the heat exchanger 27 and throwing the combustion gases in the combustion chamber 25 into direct surface contact with the coke as it emerges from the tubes. The removed oil vapor is then recycled and burned in the manner identical to that described in connection with Fig. 3. The direct surface contact of the coke as it emerges from the tubes 5 with the hot combustion gases has been found to very materially aid in the efficient removal of the oil which might tend to accumulate in the circulating body of coke and clog the same.

Additionally, it has been found preferable, in order to produce a coke containing less volatile material, to pass a stream of an oxygen-containing gas, such as air, up through the downwardly moving body of coke, as the same emerges from the tubes 5.

As shown in Fig. 4, air is piped from the air inlet 35 through the conduit 41 to below a hollow, conically-shaped member 42, which is positioned below the exit of the tubes 5. This conical member has notches or serrations along its edges. Thus, for example, with a cone of about 24 inches in diameter, serrations about 1 inch high, ½ inch across their lower edges, spaced 1 inch apart, may be used. The cone controls the flow of the coke out of the tubes 5 and insures an even contact with the air which flows up through the notches with the coke. This air causes a superficial oxidation of the coke particles and materially aids in the removal of the undesirable volatile matter which may cause clogging in the system.

In this embodiment, the worm 19 of the roto lift 17, as may best be seen in Fig. 5, is tapered at the bottom. Very surprisingly and unexpectedly, the use of this tapered screw construction more than doubles the capacity of the lift. In all other respects, the construction and operation of the embodiment shown in Fig. 4 is identical to that described in connection with Figs. 1, 2, and 3.

Though in the embodiment shown in Fig. 4, there is some direct contact of the coke particles with the hot combustion gases and some oxidation of the coke particles which necessarily results in a heating of the particles, the main heating of the coke particles for the sludge decomposition is an indirect heating in the heat exchanger 27. When an indirect heating of the moving body of coke particles is recited herein and in the claims, the same is specifically intended to designate this main heating and not to exclude the additional direct heat contact and oxidation for the removal of the hydrocarbon vapors.

The removal of the hydrocarbon vapors, as indicated in the embodiments shown in Figs. 3 and 4, will not result in any contamination of the sulfur dioxide, since over 97% of the sludge is decomposed by the hot coke in the conveyor mixer 9 and the remaining small percent in the roto lift 17. This residual small sulfur dioxide content which is not recovered through the outlet 13 is recovered through the outlet 13'.

While in the embodiments in which the hydrocarbons are separated from the circulating body of coke at a point in the cycle, the body of coke may be heated at one point in the cycle to a relatively higher temperature to facilitate the removal of the vapors, as, for example, a temperature of about 630–700° F. at the exit of the heat exchanger 27, this higher temperature has not been found to be necessary. It has been found that optimum results are obtained if the temperature of the circulating body of coke does not exceed a temperature above 500° F. at any point in the cycle. Thus, for example, in the embodiments shown in Figs. 3 and 4, the temperature of the coke at the exit of the heat exchanger 27 is preferably maintained at about 440–470° F. with a temperature of the heating gas of about 1300–1400° F. in the heat exchanger.

The coke is in all cases mixed with the sludge to produce a mixture of at least the decomposition temperature of the sludge and not exceeding 500° F. It has been found preferable to operate so that the mixture of coke and sludge is at a temperature of about 400–430° F., and this temperature is maintained in the cycle until the coke re-enters the heat exchanger tubes.

It may be noted that the drop in temperature when the sludge is added is only about 40°, so that an isothermal condition for the circulating body of coke is substantially approached. Even with this small change of temperature in the circulating body of coke, all of the hydrocarbons which would cause the circulating coke body to become oily and clog, are removed.

In the preferred embodiment of my process, with or without the removal of hydrocarbons, the mass of carrier particles circulating within the system is at least 15 times the mass of the sludge supplied to the system. This has two important and valuable results, i.e., the temperature of the particles at 7 and just before mixing with the sludge need only be very slightly higher than the decomposition temperature of the particular sludge, with the result that the decomposition is highly selective and easily controlled. In operation, it is free from the wide fluctuations and variations in temperature which characterize prior art processes, and, as mentioned, is substantially isothermal. The coke particles produced in the process are firm and relatively free from dust or fines, and the conversion efficiency approximates 100%.

I claim:

1. Device for thermally decomposing sulfuric acid sludges, which comprises means defining a substantially enclosed endless conduit for the continuous circulation of a body of coke particles therethrough and including a substantially vertically extending tubular heat exchanger having a heating gas chamber and a multiple number of tubes therethrough for the gravity flow of coke particles, a conveyor mixer within said conduit positioned for conveying coke particles from the lower end of said heat exchanger, a sludge feed inlet to said conveyor mixer, a gas take-off outlet communicating with said conduit for the removal of decomposition gases from the conduit portion within the conveyor mixing area beyond said sludge inlet, a roto lift within said conduit substantially extending vertically and positioned for conveying coke particles from adjacent the far end of said conveyor mixer, and conveyor means within said conduit positioned for passing coke particles from the top of said roto lift to the top of said heat exchanger for repassage therethrough, and means for passing heating gas through said heating-gas chamber of said heat exchanger.

2. Device according to claim 1, in which said roto lift has a substantially vertical conveyor worm tapered in an upward direction at its lower end portion.

3. Device according to claim 2, including means for passing heating gas from said heating-gas chamber in heat-exchange relation to at least a portion of the remainder of said conduit substantially counter-current to the direction of travel of material within said conduit.

4. Device according to claim 1, in which said heating gas chamber is in gas-flow communication with the portion of said conduit therebelow, and in which said means for passing heating gas through said heating chamber includes a combustion chamber, and including means for recycling at least a portion of the gases from said heating gas chamber to said combustion chamber.

5. Device according to claim 4, in which said heating chamber is in free communication with the portion of said conduit therebelow, and including means for passing a combustion-supporting gas into said conduit below said tubes.

6. Device according to claim 5, including a conically shaped member having serrated edges positioned below said tubes and in which said means for passing for said combustion-supporting gas comprises a conduit terminating below said conically-shaped member.

7. Device according to claim 6, in which said means for passing gas from said heating chamber to said combustion chamber includes a heating jacket surrounding said roto lift for the downward passage of gas therethrough.

8. Device for thermally decomposing sulfuric acid sludges which comprises means defining a substantially enclosed endless conduit for the continuous circulation of a body of coke particles therethrough and including a substantially vertically extending heat exchanger having means for the gravity flow of coke particles downward therethrough, and means for passing a heating gas in indirect heat exchange contact with the downwardly passing coke particles, a conveyor mixer within said conduit positioned for conveying coke particles from the lower end of said heat exchanger, a sludge feed inlet to said conveyor mixer, a gas take-off outlet communicating with said conduit for the removal of decomposition gases formed in said conveyor mixer, said conduit including a substantially vertically extending portion adjacent the far end of said conveyor mixer roto lift, means positioned within said vertically extending portion for lifting coke particles therethrough from the adjacent far end of said conveyor mixer and means within said conduit for passing coke particles from the top of said roto lift means to the top of said heat exchanger for repassage therethrough.

9. Device according to claim 8 including means for removing hydrocarbon vapors from said heat exchanger.

10. Device according to claim 8 in which said roto lift means has a tapered conveyor screw.

References Cited in the file of this patent

UNITED STATES PATENTS

| | | |
|---|---|---|
| 1,339,519 | Lasher | May 11, 1920 |
| 2,317,379 | Hemminger | Apr. 27, 1943 |
| 2,379,195 | Simpson et al. | June 26, 1945 |
| 2,395,503 | Ross | Feb. 26, 1946 |
| 2,412,667 | Arveson | Dec. 17, 1946 |
| 2,448,553 | Schutte et al. | Sept. 7, 1948 |
| 2,467,855 | Read | Apr. 19, 1949 |
| 2,517,339 | Offutt et al. | Aug. 1, 1950 |
| 2,571,107 | Breth | Oct. 16, 1951 |
| 2,719,779 | Bray et al. | Oct. 4, 1955 |

FOREIGN PATENTS

| | | |
|---|---|---|
| 65,379 | Netherlands | Mar. 15, 1950 |